Figure 1:
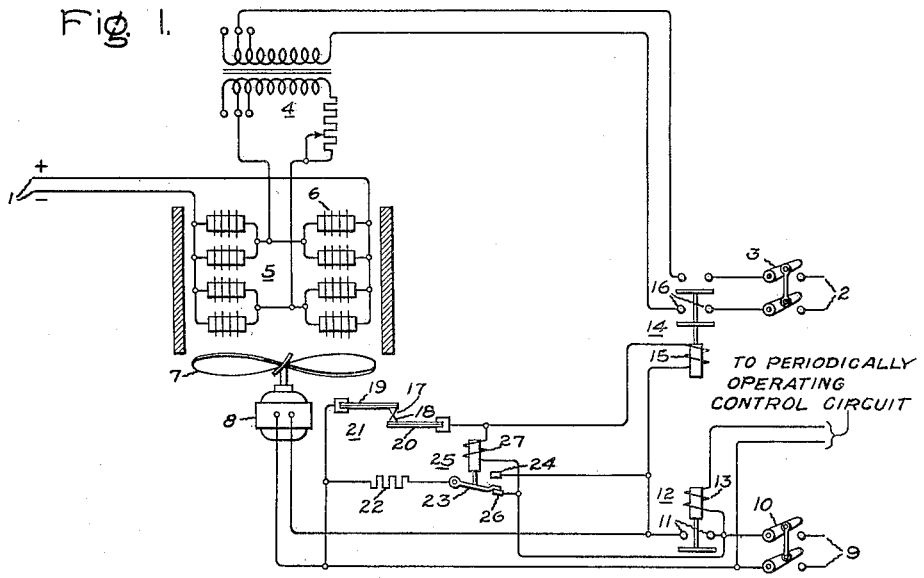

March 22, 1938.  E. A. HARTY  2,112,093

PROTECTION MEANS FOR FAN COOLED RECTIFIER AND THE LIKE

Filed Aug. 24, 1937

Inventor:
Edgar A. Harty,
by Harry E. Dunham
His Attorney.

Patented Mar. 22, 1938

2,112,093

UNITED STATES PATENT OFFICE 2,112,093

PROTECTION MEANS FOR FAN COOLED RECTIFIER AND THE LIKE

Edgar A. Harty, Marblehead, Mass., assignor to General Electric Company, a corporation of New York Application August 24, 1937, Serial No. 160,628

3 Claims. (Cl. 175—363)

This is a continuation in part of my copending application, Serial No. 68,061, filed March 10, 1936.

My invention relates to apparatus which requires in its operation a current of cooling medium to remove heat losses and which is subject to damage due to overheating in the event of the stoppage of the current of cooling medium. The invention relates more particularly to rectifier apparatus including rectifier devices of the contact type arranged for relatively large power output and in which a rise in operating temperature above a predetermined safe limit is prevented by a blower means.

Rectifying apparatus is commonly employed to provide direct current from alternating current power lines for charging storage batteries and for supplying load circuits. For these and similar uses fan cooled contact rectifiers of the copper oxide type, as described for example in Amsden Patent No. 1,947,240, are eminently suitable by reason of their simplicity, compactness, reliability in operation, and long life.

The copper oxide rectifier, however, is a device which is injured if the temperature therein is permitted to rise more than a predetermined number of degrees, and difficulties have been encountered in the use of apparatus employing contact rectifier devices due to the disablement or stoppage of the blower means supplying the cooling air for the rectifier devices with consequent destructive rise of the rectifier temperature.

In my above-mentioned application Serial No. 68,061, rectifier apparatus is shown which is subject to overheating upon disablement of the blower means. A thermostatic switch means for the apparatus is provided normally continuously so energized that the operation of the rectifier would be prevented by the action of the thermostatic means if the functioning thereof were not blocked by the action of the air blast on the thermostatic means. Upon disablement of the blower, accompanied by reduced flow or entire stoppage of the air blast, the blocking effect of the air blast on the thermostatic means is prevented and the thermostatic means then functions to disconnect the rectifier. The thermostatic means comprises a heatable element continuously energized from an electric circuit, but by reason of its being mounted in the blower air blast the heatable element is so cooled thereby that the thermostatic means cannot operate to cut off or otherwise modify the operation of the rectifier apparatus. Upon stoppage of the air blast for any reason, or reduction of the air blast below a predetermined limit, the cooling effect of the air blast disappears or diminishes thereby permitting the temperature of the continually energized heatable element to rise sufficiently to cause the thermostatic means to function as a control means to cut off the rectifier apparatus from the supply circuit or otherwise to prevent damage due to overheating of the apparatus.

It has been suggested heretofore to employ, in connection with a rectifier system including the thermostatic protective means and blower system above described, for the charging of storage batteries or for other uses, a control arrangement which includes means for periodically disconnecting the apparatus from the supply line and reconnecting the apparatus thereto. The latter means may comprise a relay apparatus, responsive to battery voltage, for controlling the charging current and so arranged that when its actuating coil is energized the relay operates to disconnect the rectifier, the blower, and the thermostatic switch, if the battery voltage reaches a predetermined value, so that no power is used from the alternating current supply line. The voltage responsive relay then remains in the disconnecting position until its actuating coil is deenergized. To reset the voltage responsive relay a reset means is provided comprising periodically opened and closed contacts in series with the battery and the energizing coil of the voltage responsive relay.

The above described voltage responsive control system so operates that the rectifier, blower, and thermostatic switch including its heater element are alternately connected to and disconnected from the alternating current supply circuit and the load and battery circuit. If now the blower fails, then since during a given period of disconnection of the apparatus from the supply line the heater element of the thermostatic switch has time to cool, therefore at the succeeding period of connection of the apparatus to the supply line, current flows through the rectifier, with the blower stopped, until the temperature of the heater has risen high enough to cause the thermostatic switch to open and thereby to disconnect the rectifier. This process continues indefinitely, or until the fault is discovered and the apparatus is disconnected by the operator.

Thus during the time that the blower remains inoperative with the apparatus connected to the supply line, the rectifier is subjected to the heating effect of successive applications of current without the cooling blast from the blower. By reason of the ability of the dry plate rectifier to store heat, its temperature under the conditions just described tends to rise to a dangerous point.

In accordance with my present invention the above disadvantage is obviated and, in a rectifier apparatus incorporating the above-described or other means for periodic connection and disconnection of the apparatus, the rectifier remains disconnected during any period of disablement of the blower. For this purpose I provide means whereby the heater element of the thermostatic switch device remains heated under all conditions as long as the main supply switch connecting the apparatus to the supply line is closed.

The novel features which are considered to be characteristic of my invention are set forth with particularity in the appended claims. My invention itself, however, both as to its organization and method of operation together with further objects and advantages thereof may best be understood by reference to the following description taken in connection with the accompanying drawing.

Figure 2:
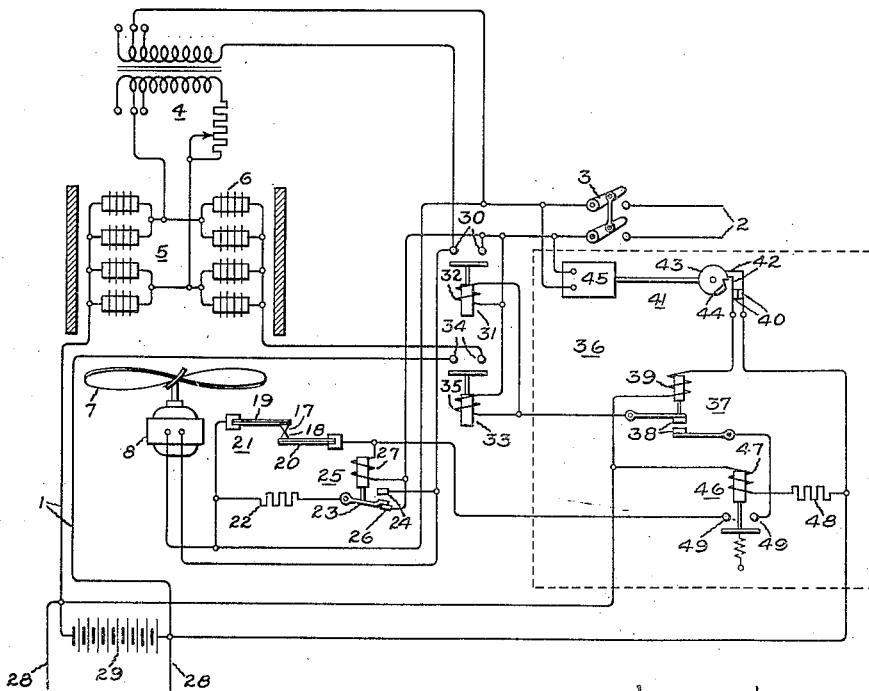

Referring to the drawing, Fig. 1 is a diagrammatic representation of a rectifier system connected to a circuit for periodically connecting the system to a supply line and disconnecting the system therefrom, for supplying direct current to a storage battery or other load from an alternating current circuit, in which my invention has been embodied; and Fig. 2 is a diagrammatic representation of a rectifier system, including a voltage responsive periodically operating control means, for supplying direct current to a load circuit and storage battery from an alternating current circuit, in which my invention has been embodied.

In Fig. 1, the numeral 1 designates a direct current circuit which may be connected to supply power for example to a load circuit and a storage battery (not shown) from an alternating current circuit 2 through a main power switch 3, a transformer 4, and rectifier apparatus 5 including a plurality of contact rectifier devices 6 which may be of the copper oxide or other suitable type, and a blower means or fan 7 to direct an air blast on the rectifiers. The fan 7 is driven by a motor 8 adapted to be connected to a control circuit 9 through a main control switch 10 and contacts 11 of a relay 12 the actuating winding 13 of which is connected to a periodically operating control circuit of any suitable type adapted in its operation alternately to connect the system to the control circuit 9, with the switch 10 closed, and to disconnect the system therefrom. To connect the rectifier apparatus 5 through transformer 4 to the alternating current circuit 2, a switch means 14 is provided in circuit 2 having an operating winding 15 adapted to be energized from the control circuit 9 to close the contacts 16 as will presently appear.

To provide means for disconnecting the rectifier apparatus 5 from supply circuit 2 by the opening of switch 14 in the event of disablement of the blower means 7, the operating winding 15 of switch 14 is adapted to be connected through main control switch 10 to circuit 9 through a circuit including contacts 11 of relay 12, winding 15, and contacts 17 and 18 and contact carrying elements 19 and 20 of a thermostatic switch means 21 having a heater means 22 arranged to heat one of the contact carrying thermostatic elements as 19.

In order to prevent the heating of the rectifier to a dangerous point by periodic flow of current therein during a period of disablement of the blower means 8, in the present embodiment of my invention the heater means 22 is adapted to be connected to circuit 9, through main control switch 10, either through a circuit including the heater 22, armature 23 and a contact 24 of a relay 25, and contacts 11 of relay 12, or through a circuit including the heater 22, and armature 23 and a contact 26 of relay 25. The actuating coil 27 for relay 25 is adapted to be connected directly through main control switch 10 to circuit 9 through a circuit including the coil 27 and the contact members 17 to 20 of thermostatic switch 21.

In operation of the system of Fig. 1, let us assume that the main power switch 3 is closed, contacts 11 of periodically operated relay 12 are in closed position, and switch 14, relay 12, relay 25, and thermostatic switch 21 are in their illustrated positions. Upon closing of main control switch 10, operating coil 15 of switch 14 is energized by current from circuit 9 flowing in the circuit including relay 12, coil 15, and the contact members of thermostatic switch 21, thereby closing contacts 16 of switch 14. At the same time current for motor 8 to drive fan 7 is supplied from circuit 9 through relay 12, and energizing current from circuit 9 is also supplied to operating coil 27 of relay 25 through the circuit including coil 27 and the contact members 17 to 20 of thermostatic switch 21 thereby connecting thermostatic switch heater element 22 to circuit 9 through the circuit including relay 12, contact 24 and blade 23 of relay 25, and heater 22. Heater 22 begins immediately to heat, thereby tending to transmit to the adjacent thermostatic switch element 19 sufficient heat to cause the latter to open the contacts 17 and 18 and thereby to deenergize operating winding 15 of switch 14 and to open the power circuit 2 at contacts 16.

Assuming now that the air blast means constituted by blower 7 and its driving motor 8 is not in disabled condition and that the fan 7 is consequently rotating, the air blast produced thereby prevents the thermostatic switch 21 from opening, due to the cooling effect of the air blast on heater 22. Power circuit 2 therefore remains connected to rectifier 5 through transformer 4 to supply power to circuit 1. When, at the end of the period of closure of the periodically operated relay 12 the contacts 11 thereof assume the open position, operating winding 15 in circuit with contacts 11 is deenergized thereby opening switch 14 and disconnecting transformer 4 and rectifier 5 from power circuit 2; current to motor 8 in circuit with contacts 11 is cut off, thereby stopping fan 7; also heating current for heater 22 in circuit with contacts 11 of relay 12 and contact 24 and blade 23 of relay 25 is cut off and the heater immediately cools, therefore not causing contacts 17 and 18 of thermostatic switch 21 to open. Operating coil 27 remains energized from circuit 9 through the circuit including coil 27 and the contact members 17 to 20 of the thermostatic switch 21 thereby holding blade 23 of relay 25 closed on contact 24.

At the succeeding closed period of the periodically operated relay 12, again, simultaneously, switch 14 is closed to connect transformer 4 and rectifier 5 to power line 2; heater 22 of thermostatic switch 21 is supplied with heating current through contact 24 and blade 23 of relay 25; and fan 7 begins to supply a cooling air blast to the heater 22 thereby preventing the opening of contacts 17 and 18 of switch 21.

Thus during normal conditions in the air blast means comprising fan 7, motor 8 and the connections therefrom to circuit 9, the entire system is alternately connected to and cut off from the power circuit 2 and the control circuit 9 except for the circuit in which flows the energizing current for coil 27 of relay 25, to hold blade 23 continuously closed on contact 24. No current for heater 22, as well as for fan 7, is, therefore, used during the open periods of the periodically operated relay 12 during which the rectifier is disconnected from the power circuit but only during the closed or power periods.

If, however, the air blast means becomes disabled, then, assuming as before that the contacts 11 of periodically operated relay 12 are first in closed position, then since fan 7 fails to supply an air blast to heater 22 the latter heats and causes thermostatic element 19 in turn to heat sufficiently to open contacts 17 and 18 thereby opening switch 14 and disconnecting transformer 4 and rectifier 5 from power circuit 2. Since the operating coil 27 of relay 25 is supplied from circuit 9 through a circuit including the contacts 17 and 18, this coil is also deenergized thereby disconnecting blade 23 from contact 24, but the blade immediately closes again on contact 26, heater 22 thus continuing to be energized, being energized directly now from circuit 9 through switch 10 and not as previously through the circuit including periodically operated relay 12.

In the hereinabove mentioned prior rectifier system including means for periodically disconnecting the apparatus from the power line and reconnecting the apparatus thereto, as before pointed out, if the blower becomes disabled the rectifier tends to store heat to a dangerous degree by reason of the deenergizing of the heater means for the thermostatic switch at the end of each closed period of the periodically operating means. In accordance with my present invention such storage of heat is prevented by the provision of the relay 25 which, as above explained, so operates that upon failure of the air blast the heater 22 is not permitted to cool at each open period of the periodically operating relay 12 but is maintained hot by current direct from the control circuit 9 through control switch 10. This result is obtained without, however, maintaining energizing current in heater 22 during the open periods, when the air blast is not disabled and the system is operating normally, since under the latter conditions blade 23 of relay 25 is continuously closed on contact 24 during the closed periods but the circuit including contact 24 is opened by relay 12 at each open period of the periodically operating means.

Referring to Fig. 2, the rectifier system disclosed therein is similar in general to the system of Fig. 1, in that a direct current circuit 1, connected in Fig. 2 to a load circuit 28 and a storage battery 29, is adapted to be supplied with power from an alternating current circuit 2 through a main power switch 3, a transformer 4, and a rectifier apparatus 5 comprising rectifier devices 6 of the dry plate or contact type cooled by an air blast provided by a fan 7 driven by a motor 8, the rectifier devices 6 being protected from damage due to overheating, in the event of disablement of the air blast means, by a protective system including a thermostatic switch means including contacts 17 and 18 carried by members 19 and 20, and a heater means 22, and a relay 25 having an operating coil 27, contacts 24 and 26, and a blade 23 closing on contact 24 when coil 27 is energized and closing on contact 26 when the coil is deenergized.

In the system of Fig. 2, however, the control circuit 9 and its main control switch 10 of Fig. 1 are omitted, and motor 8, operating coil 27 of relay 25, and heater 22 are arranged to be energized, through main switch 3, from power circuit 2. Motor 8 is adapted to be connected to circuit 2, through switch 3, through a circuit including the motor 8 and contacts 30 of a switch 31 having an operating winding 32 energized in a manner to be explained presently. Operating coil 27 is normally connected to circuit 2, through switch 3, through a circuit including coil 27 and the contact members 17 to 20 of thermostatic switch 21. Heater 22 is adapted to be connected to circuit 2, through switch 3, either through a circuit including the heater 22, and blade 23 and contact 26 of relay 25, or through a circuit including the heater 22, blade 23 and contact 24 of relay 25, and contacts 30 of switch 31. A switch 33 having contacts 34 connected in one lead of circuit 1 and having an operating coil 35 adapted to be energized in parallel with coil 32 of switch 31 is provided to disconnect the rectifier from circuit 1, in a manner to be explained hereinafter.

In the system of Fig. 2, a usual control means indicated generally by the rectangle 36, responsive to battery voltage and including periodically operating relay-reset means is preferably employed. This control means may comprise a voltage responsive relay 37 having contacts 38, in series with the operating coils 32 and 35 of switches 31 and 33, and an operating coil 39 adapted to be connected to battery 29 through a circuit including the coil 39, and contacts 40 of a relay-reset means 41 including brushes or wipers 42 carrying contacts 40 and in contact with a cam 43 having a recess or notch 44 in its active surface and adapted to be rotated slowly by a motor and reduction gear device indicated by the rectangle 45 and energized from the power circuit 2. The reset means 41 is preferably so arranged that in each hour the contacts 40 remain closed for fifty-seven to fifty-eight consecutive minutes and remain open for two or three consecutive minutes. The relay 37 is so arranged that when the battery voltage rises to a predetermined value, assuming a closed period of reset means 41, the contacts 40 then being in their illustrated position, the coil 39 operates to open the contacts 38 which then remain open until the cam 43 has rotated to such a position that the reset means 41 is in its open period, the circuit including coil 39 then being broken at the contacts 40 by the dropping of the leading brush of the pair 42 into the recess 44 of cam 43.

To prevent starting of the system unless the storage battery 29 is connected to circuit 1, a relay 46 is provided having an operating coil 47 connected across circuit 1 through a resistor 48 and having contacts 49 adapted to be connected in a circuit including power circuit 2, operating coils 32 and 35 of switches 31 and 33, contacts 38 of relay 37, the contacts 49, and contact members 17 to 20 of thermostatic switch 21.

In operation of the system of Fig. 2, assuming first that the air blast means is not in disabled condition, when battery 29 is connected to line 1, operating coil 47 of relay 46 is energized thereby closing contacts 49. The contacts 38 of relay 37 being in closed position, reset means 41 being in its illustrated position, and conditions in battery 29 and in load circuit 28 being assumed to be such that the battery voltage is below its predetermined normal value, if the main switch 3 is now closed, operating coil 27 of relay 25 is energized through the circuit including the coil 27 and contact members 17 to 20 of thermostatic switch 21, thereby closing blade 23 on contact 24. Operating coils 32 and 35 in parallel are energized from circuit 2 through the circuit including the coils 32 and 35, contacts 38, contacts 49, and the contact members 17 to 20 of thermostatic switch 21, thereby closing contacts 30 and 34 of the switches 31 and 33. Rectifier 5 is now connected to the battery and load through switch 33; transformer 4 and rectifier 5 are connected to circuit 2 through switch 31; heater 22 of thermostatic switch 21 is supplied with heating current through the circuit including the heater 22, blade 23 and contact 24 of relay 25, and contacts 30 of switch 31; and fan 7 is operated by motor 8 supplied from circuit 2 through the circuit including the motor 8 and contacts 30 of switch 31, the air blast then cooling the heater 22 and preventing the opening of contacts 17 and 18 of switch 21.

Assuming now that by reason of the load current in circuit 28 dropping to a low value or to zero, charging current to battery 29 from rectifier 5 then flows in sufficient amount to cause the voltage of the battery to rise to or above its predetermined normal value, voltage responsive relay 37 operates to open its contacts 38 thereby opening the circuit including operating coils 32 and 35 and tripping the switches 31 and 33 to open the contacts 30 and 34. Upon opening of switch 33, rectifier 5 is disconnected from direct current circuit 1. Upon opening of switch 31, transformer 4 and rectifier 5, and motor 8 are disconnected from circuit 2. Since blade 23 of relay 25 remains closed on contact 24, heater 22, being in the circuit including blade 23 and contact 24 and contacts 30 of switch 31, is also disconnected from circuit 2. The system then remains idle during the rest of the closed period of reset means 41, no current flowing except the energizing current in coil 27 of relay 25.

When the cam 43 has rotated to the point at which the open period of reset means 41 begins, that is, the point at which the contacts 40 open due to the dropping of the leading brush of brushes 42 into the recess 44, operating coil 39 of relay 37 is deenergized, and relay 37 is reset, its contacts 38 closing and thereby again starting the system into operation. The system then remains in operation during the entire open period of the reset means 41.

When, next, the cam 43 has rotated to the point where contacts 40 again close, operating coil 39 of relay 37 is again energized, tending to close contacts 38 and thereby to start the system into operation, but contacts 38 remain open, since, as above explained, it is assumed that by reason of low load or no load conditions in circuit 28, the voltage of battery 29 remains at its predetermined or normal value. Therefore, during the succeeding closed period of reset means 41 the system remains shut down, to be again set into operation when contacts 40 of reset means 41 reopen.

Thus as long as the battery voltage is at or above its normal value, the reset means 41 operates periodically to shut down the system and to start the system into operation. Therefore, as in the system of Fig. 1, during normal conditions in the air blast means, the entire system shown in Fig. 2 may be, under certain battery and load conditions, alternately connected to and disconnected from its power circuit 2, except for the circuit including the energizing coil 27 of relay 25, no current therefore flowing in heater 22 of thermostatic switch 21 during the closed periods of the reset means 41.

If now, in normal operation of the system of Fig. 2 under the assumed conditions of high or normal battery voltage the air blast means becomes disabled during, for example, the closed period of the reset means 41, then when the open period of reset means 41 begins and contacts 40 open thereby deenergizing coil 39 of relay 37 and causing the latter relay to close its contacts 38, since fan 7 does not now supply an air blast to cool the heater 22, the latter heats, causing thermostatic switch contacts 17 and 18 to open, thereby disconnecting the rectifier from circuits 1 and 2 as before explained. Since operating coil 27 of relay 25, in the circuit including the contacts 17 and 18, is now deenergized, blade 23 closes on contact 26 thereby connecting heater 22 directly to circuit 2, through main switch 3. Therefore, heater 22 remains heated during this open period of reset means 41 thereby maintaining contacts 17 and 18 of switch 21 in open position. During the succeeding closed period of reset means 41, contacts 38 of relay 37 open because of the assumed continued normal voltage of battery 29; contacts 17 and 18 of thermostatic switch 21 also remain open by reason of the continued heating of heater 22 by current from circuit 2 through blade 23 and contact 26.

In the system of Fig. 2, therefore, under the assumed condition of normal battery voltage, upon disablement of the air blast means, dangerous heating of the rectifier is prevented, as in the system of Fig. 1, by the provision of the relay 25 which in Fig. 2 so operates that the heater 22 is maintained heated during both open and closed periods of the reset means 41, this result, however, being obtained without wasting current, when the air blast means is not disabled in the heater 22 during the closed periods of the reset means 41.

In the above description of operation of the system of Fig. 2 it has been assumed that the battery voltage remained high enough, during an extended period covering many repeated cycles of the reset means 41, to cause operating coil 39 of voltage responsive relay 37 to open contacts 38 during the closed period of contacts 40 of reset means 41. It will be readily understood from the preceding description of the system that if load conditions are such, during an extended period, that the voltage of battery 29 is below the normal value, contacts 38 of relay 37 will remain continuously in closed position during this extended period, the system then remaining in operation during both closed and open positions of reset means 41 if the air blast means is not disabled, and, as before, remaining continuously shut down if the air blast means is disabled, and that, therefore, during extended periods during which the battery voltage is below its normal value, no periodic starting and stopping of the system by the relay-reset means 41 occurs.

It will be readily apparent to those skilled in the art that the voltage responsive control means 36 described in connection with the modification shown in Fig. 2 may be incorporated in the system shown in Fig. 1.

The system in accordance with my present invention has been described in connection with rectifiers of the dry plate type. It is to be understood, however, that the invention is applicable to systems incorporating rectifiers of other types, for example, of the space discharge or of the vapor electric type.

My invention has been described herein in particular embodiments for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States, is:—

1. In combination, a rectifier system, a blower adapted to cool the rectifier, a current source for said system, a thermostatic switch adapted to disconnect the rectifier from said source upon disablement of said blower, said switch having a heater element adapted to be cooled by said blower, means adapted periodically to connect said system to said source and to disconnect said system therefrom, and means operative during extended periods of operative condition of said blower to heat said heater element only during the periods of connection of said system to said source and operative during extended periods of disabled condition of said blower to heat said heater element continuously during said last-named periods.

2. In combination, a rectifier system, a blower adapted to cool the rectifier, a current source, a control circuit, a thermostatic switch in said control circuit adapted to disconnect the rectifier from said source upon disablement of said blower, said switch having a heater element adapted to be cooled by said blower, means associated with said control circuit adapted periodically to connect said system to said source and to disconnect said system therefrom, and means associated with said control circuit operative during extended periods of operative condition of said blower to heat said element only during the periods of connection of said system to said source and operative during extended periods of disablement of said blower to heat said element continuously during said last-named periods.

3. The combination with a rectifier system, a blower adapted to cool the rectifier, a current source for said system, a thermostatic switch adapted to disconnect the rectifier from said source upon disablement of said blower, said switch having heater means including a heater element adapted to be cooled by said blower, and means adapted periodically to connect said system to said source and to disconnect said system therefrom, of a switch to control the heating of said element, and means operative during extended periods of operative condition of said blower to operate said last-named switch to cause heating of said element only during the periods of connection of said system to said source and operative during extended periods of disablement of said blower to operate said last named switch to cause heating of said element continuously during said last named periods.

EDGAR A. HARTY.